July 1, 1924.
A. WYZENBEEK
ELECTRIC TOASTER AND HEATER
Filed April 6, 1923
1,499,757
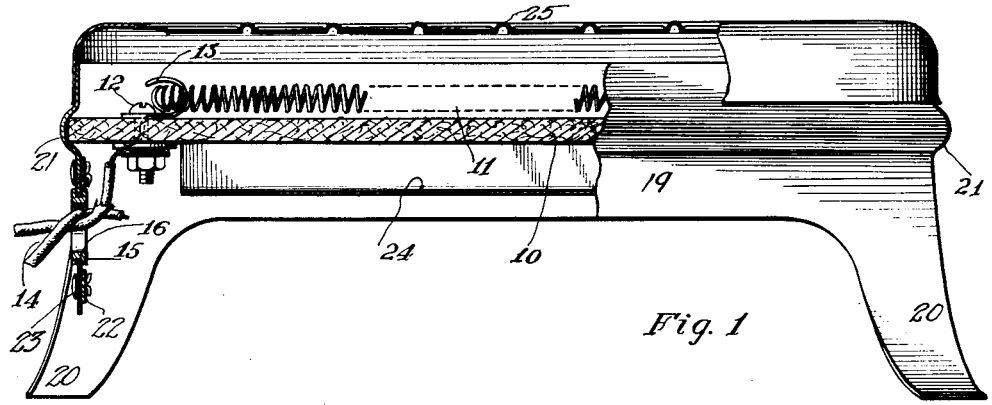
Fig. 1
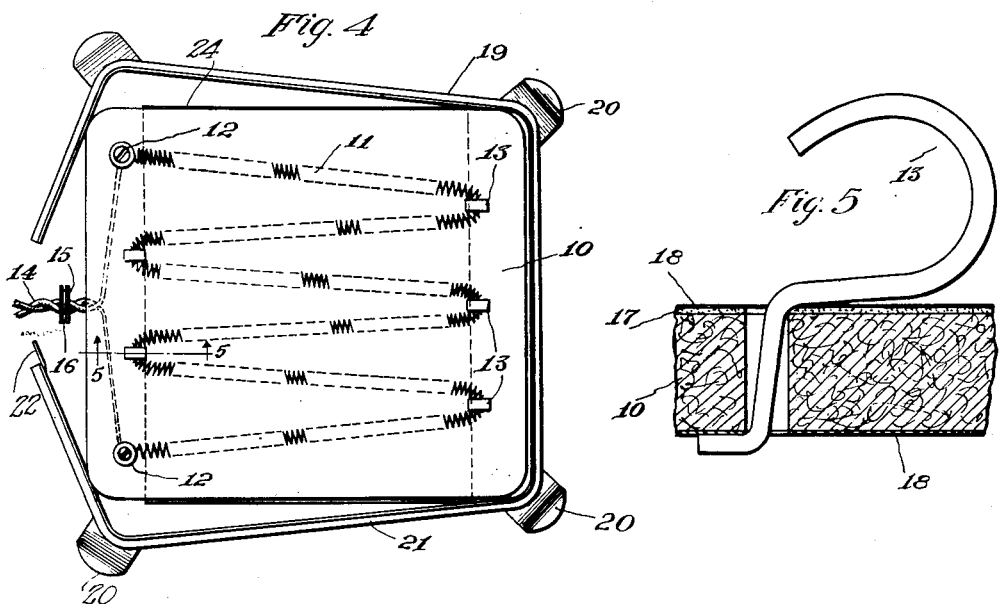
Fig. 4
Fig. 5
Fig. 2
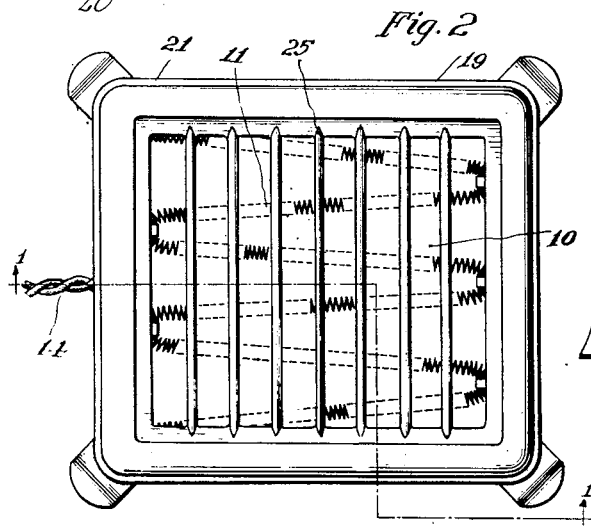
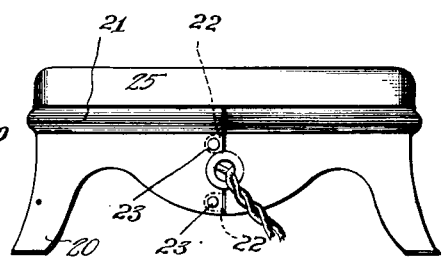
Fig. 3
Inventor:
Andrew Wyzenbeek
Williams Bradbury
McCaleb & Pierce
Attys.

Patented July 1, 1924.

1,499,757

UNITED STATES PATENT OFFICE.

ANDREW WYZENBEEK, OF CHICAGO, ILLINOIS, ASSIGNOR TO FRANK L. KOHLHASE, OF CHICAGO, ILLINOIS.

ELECTRIC TOASTER AND HEATER.

Application filed April 6, 1923. Serial No. 630,260.

*To all whom it may concern:*

Be it known that I, ANDREW WYZENBEEK, a citizen of the United States, and resident of Chicago, in the county of Cook and State of Illinois, have invented a certain new and useful Improvement in Electric Toasters and Heaters, of which the following is a full, clear, concise, and exact description, reference being had to the accompanying drawings, forming a part of this specification.

My invention contemplates several improvements in a device which is particularly adapted to be used as a toaster, but which is not necessarily restricted to such use.

One of the principal objects of the invention is to provide a device of the class mentioned which comprises a heating element support of insulating material which is of excellent appearance, which will not discolor under the extremely high temperatures to which it is subjected when in use and which is a most excellent reflector of radiant heat.

Another object of the invention is to provide a heater comprising a frame formed of a single piece of sheet metal which is conformed to embrace and firmly hold the heating element support in a most satisfactory and economical manner.

A further feature of the invention resides in the provision and combination of certain details of construction which permit the heating element support and all parts carried or connected therewith to be completely assembled before the said support is placed within the heater frame.

These and other objects, features and advantages of my invention will appear as the following detailed description progresses.

In the accompanying drawings illustrating my invention:

Figure 1 is a side view, partly in section and partly in elevation, illustrating the device of my invention;

Figure 2 is a top plan view of the same;

Figure 3 is an end elevational view thereof;

Figure 4 is a top plan view illustrating the heater frame as it appears before it is caused to embrace, and is secured around, the heating element support; and Figure 5 is an enlarged fragmentary sectional view taken on the line 5—5 of Figure 4.

Similar characters of reference refer to similar parts throughout the several views.

Referring to the drawings, at 10 I have illustrated a heating element support which is preferably formed of asbestos board or other similar material which is an electrical insulator and a poor conductor of heat. The said heating element support is substantially rectangular in shape, but is preferably provided with rounded corners in order that it may fit snugly and tightly within the heater frame in the manner presently to be described.

Disposed over the upper surface of the element 10 and supported thereby is the electrical heating element 11, which, in the present instance, is in the form of an elongated helix of resistance wire which extends back and forth across the upper surface of the support 10 in zigzag fashion. The ends of the heating element 11 are connected to the terminal screws 12—12. The said heating element is further supported by metal clips 13—13 which engage around the said heating element and pass through apertures in the support 10, as is most clearly illustrated in Figure 5. The terminal screws 12—12 are electrically connected to the conductors of a twisted pair 14, which, it will be noted, pass through an insulating bushing 15 which is provided with a peripheral groove 16.

In the course of the manufacture of the device of my invention, the several elements hereinbefore described are preferably assembled as shown before they are placed within the heater frame presently to be described. However, it should be explained that before the heating element is applied to the support 10, the latter is treated to give it certain coatings which are very advantageous and which constitute salient features of the present invention. In thus treating the heating element support 10, its upper surface,—i. e., the surface which is presented to the heating element when the latter is placed thereon,—is coated with a fluid mixture consisting of approximately 50% of silicate of soda and 50% of the metallic powder commercially known as aluminum bronze. This mixture may be applied either with an ordinary brush or with an air brush. It dries very quickly and leaves on the upper surface of the heating element support a hard, glassy coating 17 which gives the upper surface of the support the appearance of metal and affords other advantages which will presently be described. After the application of the coating 17, the support 10 is preferably dipped in, or otherwise coated with, silicate of soda to form over the coating 17 another coating 18, which being practically transparent, in no way affects the appearance given to the upper surface of the heating element support by the coating 17, but does eliminate the possibility of particles of the aluminum bronze being disengaged from the support 10.

The heating element supports of asbestos or similar material, which are ordinarily employed in connection with toasters and other electrical heaters have not to my knowledge been coated in the manner herein explained. Such prior supports have been of indifferent appearance, even when new, and almost invariably become unpleasing in appearance when used, due to scorching or discoloration of the asbestos or other material, under the heat of the electrical heating element. I have found that a heating element support of asbestos or similar material coated in the manner herein described will not discolor under heat, even after long continued usage. Furthermore, I find that the coating comprising the aluminum bronze is a most excellent reflector of radiant heat, a feature which is, of course, of great advantage in a toaster.

While, in the absence of knowledge of prior use of aluminum bronze in connection with electrical heating element supports, I do not wish to limit myself to the use of silicate of soda in connection with the aluminum bronze, I wish to say that the silicate of soda affords certain advantages which are not afforded when the aluminum bronze is mixed with other materials prior to its application. Thus, for instance, a mixture of aluminum bronze and the material commercially known as banana oil, the latter being the commonly used carrier for aluminum bronze, will not afford all the advantages which are derived from the use of aluminum bronze in connection with silicate of soda.

It might be supposed that aluminum bronze applied to the heating element support in the manner herein explained would be disadvantageous because affording a leakage path for the electrical energy supplied to the heating element. However, continued use of the devices of my invention clearly shows that the efficiency of the heating element as such is in no way impaired by the presence of the aluminum bronze. The presence of the aluminum bronze affords a number of decided advantages hereinbefore explained, and so far as I know, involves no disadvantage save, of course, the extremely slight cost of the labor and material involved in its application.

Attention is now directed to the frame 19, which, it will be noted, is formed of a single piece of metal and is conformed to extend entirely around the heating element support 10, the said frame being provided with four integral legs 20—20. It will be noted that the frame 19 is provided with a horizontal bead 21, which is co-extensive therewith, this bead providing an inwardly opening channel adapted to receive the several edges of the heating element support. Formed integral with one end of the frame are the ears 22—22, which are adapted to be secured by rivets 23 to the other end of the frame which overlaps said ears when the frame is assembled and secured around the heating unit support 10. Attention is directed to the fact that the opposed edges of the ends of the frame 19 are provided with semi-circular notches adapted to receive the insulating bushing 15, as is most clearly illustrated in Figures 1 and 3. This construction permits the conductors 14 and the bushing flange 15 to be assembled with the heating element support, shown in Figure 4 before the said heating element support is placed within the frame 19. In assembling the heating element support within the frame 19, the ends of the latter are sprung apart, as illustrated in Figure 4. The heating element support 10 is then placed within the frame 19 with the edges of said support located directly opposite the channel afforded by the bead 21. The ends of the frame 19 are then moved into engagement with each other and with the bushing 15 and are secured together by the rivets 23, as previously explained. When the ends of the frame are thus secured together, the heating element support 10 and the several parts carried thereby are held firmly within the frame 19 without the necessity for securing the support 10 to the frame by screws or other special devices, as is the customary practice. If desired, a sheet of tin or other metal indicated at 24 may be caused to lie under the heating element support 10 by engaging opposite ends thereof within the channels afforded by oppositely located portions of the frame bead 21.

Any suitable means may be employed for supporting the bread or article to be heated over the heating element 11. I have shown this means in the form of a grill 25 which is preferably formed from a single piece of metal and is fitted snugly down over the upper portion of the frame 19, downward movement of the grill structure relative to the frame being limited by the bead 21.

While I have illustrated my invention in the preferred embodiment thereof, I appreciate that various changes in design may be effected without departing from the spirit and scope of my invention. Hence, I desire that my invention and patent shall be limited only by the scope of the appended claims.

What I claim as new and desire to secure by Letters Patent of the United States is:

1. A support for an electrical heating element for use in electrical heating apparatus, said support consisting of an asbestos board provided on the surface thereof with a covering consisting of aluminum bronze and silicate of soda.

2. In an apparatus of the class described, the combination of an electrical heating element, a board which is a poor conductor of heat disposed adjacent said heating element and a coating comprising aluminum bronze covering that surface of said board which is presented to the heating element.

3. In an electrical heating device of the class described, the combination of an electrical heating element, a board which is a non-conductor of electricity and by which said heating element is supported, said board having that face which is presented to the heating element provided with a covering comprising aluminum bronze.

4. A device of the class described comprising an electrical heating element, a support by which said heating element is carried, said support consisting of an asbestos board provided on that surface thereof which is presented to the heating element with a covering comprising aluminum bronze.

5. In a device of the class described, the combination with an electrical heating element of a board of poor heat conducting material disposed adjacent said element and having the surface thereof which lies nearest the heating element provided with a covering consisting of aluminum bronze and silicate of soda.

6. In an electrical heating apparatus of the class described, the combination with an electrical heating element of a board of poor heat conducting material disposed adjacent said element and having the surface thereof which lies nearest the heating element provided with a first coating comprising aluminum bronze and with a second and outer coating comprising silicate of soda.

7. In an electrical heating device of the character described, an electrical heating element, a board of poor heat conducting material disposed adjacent said element and having the surface thereof which lies nearest the heating element provided with a first coating of silicate of soda and aluminum bronze and with a second and outer coating of silicate of soda.

8. In an electric toaster, a support for the article to be toasted, a board which is a poor conductor of heat and a non-conductor of electricity disposed substantially parallel with and spaced from the aforesaid support, an electric heating element disposed between said support and said board and being carried by the latter, that portion of the board which is presented to the heating element being provided with a coating comprising a metallic material which serves to reflect radiant heat.

9. In a device of the class described, an electrical heating element and an insulating support therefor provided on the surface thereof which lies adjacent the heating element with a glassy covering which comprises a metallic material having the property of reflecting radiant heat.

In witness whereof, I hereunto subscribe my name this 28th day of March, 1923.

ANDREW WYZENBEEK.

Witnesses:
EDNA V. SUSTAFSON,
EMILE J. BOURGEOIS.